(12) United States Patent
Lestringant et al.

(10) Patent No.: US 10,405,379 B2
(45) Date of Patent: Sep. 3, 2019

(54) INDUCTION COOKING PLATE AND PRODUCTION METHOD

(71) Applicant: EUROKERA S.N.C., Chateau Thierry (FR)

(72) Inventors: Claire Lestringant, Paris (FR); Rene Gy, Bondy (FR); Gaelle Ferriz, Reims (FR); Pablo Vilato, Paris (FR)

(73) Assignee: EUROKERA S.N.C., Chateau Thierry (FR)

( * ) Notice: Subject to any disclaimer, the term of this patent is extended or adjusted under 35 U.S.C. 154(b) by 401 days.

(21) Appl. No.: 15/106,678

(22) PCT Filed: Dec. 15, 2014

(86) PCT No.: PCT/FR2014/053337
§ 371 (c)(1),
(2) Date: Jun. 20, 2016

(87) PCT Pub. No.: WO2015/092245
PCT Pub. Date: Jun. 25, 2015

(65) Prior Publication Data
US 2016/0338152 A1    Nov. 17, 2016

(30) Foreign Application Priority Data

Dec. 20, 2013 (FR) .................................. 13 63157

(51) Int. Cl.

| | |
|---|---|
| *H05B 6/12* | (2006.01) |
| *C03C 3/083* | (2006.01) |
| *C03C 3/085* | (2006.01) |
| *C03C 3/087* | (2006.01) |
| *C03C 3/091* | (2006.01) |
| *C03C 3/093* | (2006.01) |
| *C03C 3/097* | (2006.01) |
| *C03C 21/00* | (2006.01) |
| *C03C 17/32* | (2006.01) |
| *H05B 3/68* | (2006.01) |

(52) U.S. Cl.
CPC ........... *H05B 6/1209* (2013.01); *C03C 3/083* (2013.01); *C03C 3/085* (2013.01); *C03C 3/087* (2013.01); *C03C 3/091* (2013.01); *C03C 3/093* (2013.01); *C03C 3/097* (2013.01); *C03C 17/32* (2013.01); *C03C 21/002* (2013.01); *H05B 6/12* (2013.01); *C03C 2217/72* (2013.01); *C03C 2217/78* (2013.01); *C03C 2218/365* (2013.01)

(58) Field of Classification Search
CPC ...... H05B 6/02; H05B 6/1209; H05B 6/1218; C03C 3/083; C03C 3/085; C03C 3/087; C03C 3/091; C03C 3/093; C03C 3/097; C03C 3/112; C03C 3/118; C03C 21/002; C03C 21/008; C03C 17/00; C03C 17/006; C03C 17/32; C03C 2217/72; C03C 2217/78; C03C 2217/485; C03C 2218/36; C03C 2218/365
USPC ...... 219/443.1, 452.111, 452.12, 460.1, 620, 219/622
See application file for complete search history.

(56) References Cited

U.S. PATENT DOCUMENTS

| | | | |
|---|---|---|---|
| 6,413,892 B1 * | 7/2002 | Koyama | ................ C03C 3/087 428/846.9 |
| 2005/0250639 A1 | 11/2005 | Siebers et al. | |
| 2012/0085336 A1 | 4/2012 | Brunet et al. | |
| 2013/0098903 A1 * | 4/2013 | Di Giovanni | ....... C03C 10/0027 219/622 |
| 2013/0256301 A1 | 10/2013 | Laurent et al. | |
| 2015/0030838 A1 | 1/2015 | Sellier et al. | |

FOREIGN PATENT DOCUMENTS

| | | |
|---|---|---|
| FR | 2 861 720 A1 | 5/2005 |
| GB | 2 079 119 A1 | 1/1982 |
| WO | 2013/136013 A2 | 9/2013 |

OTHER PUBLICATIONS

International Search Report dated Mar. 10, 2015 in PCT/FR14/53337 filed Dec. 15, 2014.

* cited by examiner

*Primary Examiner* — Hung D Nguyen
(74) *Attorney, Agent, or Firm* — Oblon, McClelland, Maier & Neustadt, L.L.P.

(57) ABSTRACT

A plate intended for covering or receiving induction heating elements, more particularly an induction cooking plate, said plate being a glass plate with a lithium aluminosilicate-type composition, said plate having a surface zone at least 5 μm thick that includes potassium ions in replacement of the lithium ions of the glass. In addition, an induction cooking appliance incorporating said plate and to a method for producing said plate.

19 Claims, No Drawings

INDUCTION COOKING PLATE AND PRODUCTION METHOD

CROSS REFERENCE TO RELATED APPLICATION

This application is a National Stage entry under 35 USC 371 of PCT/FR2014/053337, filed on Dec. 15, 2014, and claims priority to French Patent Application No. 1363157, filed on Dec. 20, 2013.

The invention pertains to an induction plate (intended more particularly for covering or receiving induction heating elements), more particularly a cooking plate, and likewise pertains to an induction cooking appliance incorporating said plate, and to a method for producing same.

Induction cooking appliances traditionally comprise at least one inductor disposed beneath a glass-ceramic plate. These appliances are fitted into a worktop or into the chassis of a stove. The plate is used for holding items of cookware (saucepans, skillets, etc.), which are heated by virtue of the electric current induced within them by the magnetic field generated by the inductors. Lithium aluminosilicate glass-ceramics are employed for this purpose because of their thermal shock resistance, a consequence of their zero or near-zero thermal expansion coefficient. Glass-ceramics are produced by subjecting lithium aluminosilicate glass plates to a high-temperature heat treatment that generates, within the plate, crystals of beta-quartz or beta-spodumene structure, whose thermal expansion coefficient is negative.

In 1980, by patent application GB 2 079 119, a proposal was made to use optionally tempered, thick glass plates (5 or 6 mm thick) instead of the glass-ceramic. The compositions envisaged were diverse: sodo-lime, borosilicate, and aluminosilicate compositions, etc. However, these plates were never marketed, since their thermomechanical strength proved insufficient for practical daily use, and so induction cooking appliances, more than 30 years on, are still based on glass-ceramic.

Two forms of strengthening have been envisaged for improving the mechanical properties of the glass plates intended for use as cooking plates and exposed, consequently, to high temperatures during their use: thermal strengthening and chemical strengthening.

Thermal strengthening is also called tempering or toughening. It involves heating the glass above its glass transition temperature, then rapidly cooling it, generally by means of nozzles that blow air onto the surface of the glass. Since the surface cools more rapidly than the core of the glass, compressive stresses form on the surface of the glass plate, balanced by tensile stresses in the core of the plate. This method of tempering is particularly rapid (a few minutes) and economical, but in certain cases may cause deterioration in the optical quality of the glasses, the resulting surface stress (allowing the strengthening obtained to be evaluated) generally not exceeding 200 MPa.

Chemical strengthening, sometimes referred to as chemical tempering, is a treatment which employs ion exchange. The surface substitution of an ion in the glass plate (generally an alkali metal ion) with an ion of larger ionic radius (usually the closest ion with a larger ionic radius; sodium, accordingly, is traditionally replaced by potassium, and lithium by sodium) allows residual compressive stresses to be created at the surface of the glass plate, down to a certain depth. This method imparts a greater strength than that imparted by thermal strengthening, but takes longer (a few hours to weeks) and is more expensive. Moreover, glass strengthened by ion exchange has a tendency to lose its mechanical strengthening when it is exposed to high temperatures for a long time, or when it is exposed to very high temperatures, a fact which causes problems in the field of cooking plates, where the plates are constantly exposed to high temperatures and even locally to very high temperatures (an empty saucepan left forgotten on the plate in a heated state). Furthermore, since chemical tempering is a surface treatment, any scratch on the surface of the glass may be detrimental to its mechanical strength.

The aim of the present invention was therefore to develop new glass plates enlarging the range of the existing products, said plates being amenable more particularly for use wherein they are subject to daily heating to high temperatures (more particularly of possibly up to regularly 350° C. in normal use, and even locally up to 450° C. approximately in extreme situations before activation of the safety systems which interrupt heating), being suitable more particularly for use as an induction plate (intended for combination with at least one inductor, in particular in an induction cooking appliance), these new plates exhibiting high mechanical strength appropriate to their use, and retaining sufficient mechanical strength in a regular heating situation or in service situations where their surface may suffer rubs and scratches, with said plates also retaining good optical qualities and being readily obtainable.

The present invention relates accordingly to a new plate intended for covering or receiving induction heating elements, more particularly an induction cooking plate, said plate being a plate (or sheet) of glass with a lithium alumino-silicate-type composition, said plate having a surface zone at least 5 μm thick that comprises potassium ions in replacement of the lithium ions of the glass (the thickness of this zone being determined, more particularly, by a weight-taking measurement method as described later on). This zone is obtained advantageously by ion exchange (of the lithium ions in the glass) by means of potassium ions (from the surface of the glass and over the depth of the exchange zone), the glass at the surface being in compression inside said surface zone, the plate also comprising a central zone (in the remaining thickness of the glass plate) in tension, the plate according to the invention being therefore strengthened by ion exchange with potassium.

The present invention also pertains to an induction cooking appliance comprising at least one inductor disposed beneath the above-defined plate.

The present invention likewise pertains to a method for manufacturing a glass induction plate, more particularly a plate according to the invention, wherein the lithium aluminosilicate glass plate is contacted with at least one potassium salt (and thereby strengthened by ion exchange using potassium), more particularly for at least 8 h at not less than 360° C. (and preferably at not less than 400° C., more particularly at not less than 450° C.).

The plates according to the invention have the properties required for their use as induction cooking plates, exhibiting more particularly a satisfactory mechanical and thermal strength as required under their conditions of use, these strengths persisting in a regular heating situation, these plates also being resistant to scratches and having good optical qualities, and the method by which they are produced, furthermore, remaining relatively simple.

Furthermore, the particularly satisfactory and lasting mechanical strengthening that is obtained makes it possible for the thickness of the plate to be reduced, while retaining effective mechanical strength, this fact having a number of advantages in terms, in particular, of economy of materials and of energy, of weight and of ease of installation, and of visibility of the display combined with the plate. The thickness of the glass plate according to the invention may therefore advantageously be less than or equal to 4 mm, more particularly less than or equal to 3.5 mm, in particular less than or equal to 3 mm.

The lithium aluminosilicate-type glass is a glass comprising at least silica $SiO_2$, alumina $Al_2O_3$, and lithium oxide $Li_2O$. The chemical composition of the lithium aluminosilicate glass forming the plate according to the invention (initially, before exchange of the lithium ions in the surface zone, this composition also remaining that of the core plate, in the central zone) preferably comprises silica $SiO_2$ in an amount by weight of from 49% to 75%, alumina $Al_2O_3$ in an amount by weight of from 15% to 30%, and lithium oxide $Li_2O$ in an amount by weight of from 1% to 8% (other components may also be present, as specified later on). The presence of lithium oxide in the initial composition (and retained in the central zone), in combination with the alumina, allows a large number of advantages to be accumulated, especially in terms of resistance to thermal shocks, which make these compositions particularly attractive for the application in question. The chemical composition of the glass used, moreover, is preferably free from boron oxide ($B_2O_3$).

The surface zone (or exchange zone) loaded with potassium ions (in replacement, in particular, of the lithium ions) of the plate according to the invention is the zone, on each face of the plate, that extends from the surface of the plate to the depth of exchange or limiting depth over which exchange by potassium ions takes place. This zone is therefore the zone in which the level of potassium (expressed in weight percentages of potassium oxides) is greater than the level of potassium in the central zone (in which the level of potassium oxides is the level corresponding to that in the lithium aluminosilicate composition initially selected to form the glass), and preferably is the zone, starting from the surface of the plate, at any point in which the level of potassium is greater by at least 0.5% by weight relative to the level of potassium in the central zone (or in the core or in the middle or in the center) of the plate (in other words, the difference $\Delta[K_2O]$ between the $K_2O$ concentration at any point or at any thickness in this zone and the $K_2O$ concentration in the core of the plate is at least 0.5% by weight). Expressed alternatively, this surface zone is preferably the zone extending from the surface of the plate to the limiting depth of the plate from which the difference between the level of potassium at that depth and that in the core of the plate becomes less than 0.5%.

The thickness of the surface zone defined according to the invention is advantageously between 6 and 120 μm (by the weight-taking measurement method elucidated below), preferably between 20 and 90 μm, more particularly between 40 and 80 μm, or even from 50 to 70 μm in the present invention, the thickness of the central zone being generally at least 1.5 mm.

The thickness of the surface zone or exchange depth H (in micrometers) is determined using measurements of the mass of the sample before and after chemical tempering (or weight-taking measurement method). More specifically, the depth H is given by the following formula:

$$H = \frac{\Delta m}{m} \frac{M}{\Delta M} \frac{\sqrt{\pi} \, e}{\alpha}$$

In this formula, m is the mass of the sample before tempering, $\Delta m$ is the change in mass due to tempering, M is the molar mass of the glass before tempering, $\Delta M$ is the difference in molar mass between the alkali metal oxides forming part of the glass (in the present invention, the potassium oxides) and those exiting the glass for the exchange in question (in the present invention, the lithium oxides), e is the thickness of the glass, and α is the initial molar concentration of the alkali metal oxides exiting the glass during the exchange.

In general, the degree of replacement of the lithium ions with the potassium ions decreases (progressively) from the surface of the glass (where the replacement of the lithium ions with the potassium ions may be complete, in other words 100%, or near-complete (at least 95%), to the opposite limit of the surface zone (where the level of potassium oxides replacing the lithium oxides becomes less than 0.5% by weight). The level of potassium at the surface of the glass and at any point in the thickness of the surface zone is therefore greater than the level of potassium in the central zone, as indicated above. The level of potassium (expressed as weight percentages of oxides (potassium oxide), being commonly in this form in the composition) at the surface of the glass in the plate according to the invention is advantageously greater by at least 3% by weight relative to the level of potassium in the central zone (i.e., $\Delta_S[K_2O]=[K_2O]_S-[K_2O]_C \geq 3\%$, where $[K_2O]_S$ is the concentration of $K_2O$, expressed as weight percentages, at the surface, and $[K_2O]_C$ is the concentration of $K_2O$ in the core of the plate), and more particularly is greater by 5% to 14% by weight relative to the level of potassium in the central zone, this level being measured by means of an electronic micro-probe. Moreover, the level of potassium over a thickness of 5 μm (at least) starting from the surface of the glass advantageously remains relatively constant (it reduces by less than 30%, considering the ratio between the level after aging and the initial level) after aging, irrespective of the aging under normal use conditions, more particularly after heating at 350° C. for 1000 h; it also remains constant (it reduces by less than 10% or 15%) after aging caused by accidental overheating, more particularly after heating at 450° C. for 10 minutes.

The glass plate defined according to the invention is advantageously such that the flexural breaking stress (or breaking strength) in a "ring-on-tripod" test (as described below) is at least 400 MPa, preferably at least 500 MPa, more particularly at least 550 MPa, and, where appropriate, at least 600 MPa for said plate, whether this stress is measured before or after aging.

More particularly, the flexural breaking stress (in the ring-on-tripod test) is at least 550 MPa, preferably at least 600 MPa, more particularly at least 700 MPa, or even at least 750 MPa for said plate which has not been detempered (meaning as tested on a plate which has not been subjected to further heat treatments after its manufacture).

Surprisingly and advantageously, furthermore, the flexural breaking stress is at least 400 MPa, more particularly at least 500 MPa, in particular at least 550 MPa, or even at least 600 MPa for said plate after heating at 350° C. for 1000 h (simulating normal use of an induction plate over 5 years). Surprisingly and advantageously as well, the flexural breaking stress is also at least 550 MPa, more particularly at least 600 MPa, or even at least 650 Mpa, in particular at least 700 MPa for said plate after heating at 450° C. for 10 minutes (simulating an accidental event of overheating of the plate).

The plates according to the invention therefore surprisingly retain their mechanical strength (and the effects of their strengthening by ion exchange) after the detempering which generally follows the use of the glass in an application such as that of induction cooking plates (in contrast in particular to the lithium aluminosilicate plates, commonly strengthened by sodium ion exchange, which lose their mechanical strengthening when exposed to thermal aging for a significant period, as illustrated later on). The invention therefore also relates to a plate intended for covering or receiving induction heating elements, this plate being a glass plate with a lithium aluminosilicate-type composition, such that it exhibits a flexural breaking stress in a "ring-on-tripod" test of at least 400 MPa, preferably at least 500 MPa, more particularly at least 550 MPa, and, where appropriate, at least 600 MPa, before and after aging, more particularly after heating at 350° C. for 1000 h or after heating at 450° C. for 10 minutes.

The test of flexure by the ring-on-tripod method is carried out by means of an Instron 4400R machine, regulated with a crosshead descent rate of 2 mm/min, equipped with a 10 kN load sensor, a 10 mm-diameter ring with a 1 mm-radius torus, attached at the end of the Instron machine, and a stand attached to which there are 3 balls 5 mm in radius, arranged at 120° over a circle with a radius of 20 mm and a center coincident with the center of the ring.

The test specimen, measuring 70 mm×70 mm, is placed between these 3 balls and the ring, so that the center of the test specimen is in alignment with the center of the ring, to an accuracy of 1 mm. An increasing force is then applied to the ring until the test specimen breaks. Only those test specimens in which the origin of breaking is under the ring are counted. The breaking stress as a function of the force at break and of the thickness of the test specimen is given by the formula below:

$$\sigma_{(MPa)} = \frac{0.847 \times \text{force}_{(N)}}{\text{thickness}^2_{(mm)}}$$

The glass plate according to the invention also exhibits a core stress (in the central zone) of between 2 and 80 Mpa for a thickness of between 1.5 and 6 mm. This core stress (Se) is drawn from the stress profile, determined by means of a polarizing microscope equipped with a Babinet compensator. A method of this kind is described by H. Aben and C. Guillemet, in "Photoelasticity of glass", Springer Verlag, 1993, pp. 65, 123, 124, 146).

Advantageously too, the glass plate defined according to the invention exhibits enhanced resistance to scratching, as manifested in the fact that its surface remains free of flakes after application of a Vickers diamond point (of defined geometry according to standard ISO 6507 or C1327) under a force of 1 N (or less), this test being carried out by applying the point with a constant force (with different, increasing forces generally being tested until flakes are observed to appear, in other words until glass is observed to be removed over a width of at least 100 μm relative to the line of application of the point) on the glass plate and by moving it at a rate of 2 m/min over a length of 1 mm, at ambient temperature. The improved scratch resistance on the radius of the glass plate defined according to the invention is also manifested in the fact that its surface is free from lateral cracks (in the form of horseshoes (or Hertz cones) after application of an Erichsen ball (steel sphere 500 μm in diameter) under a force of 20 N (or less), or even 30 N, this test also being carried out by applying the ball with constant force (where different increasing forces are tested until lateral cracks are observed to appear relative to the line of application of the ball) on the glass plate and by moving it at a rate of 2 m/min over a length of 1 mm, at ambient temperature.

Preferably, according to the invention, the chemical composition of the glass in the plate (initially, before exchange, this composition also being that at the core of the plate after exchange) comprises (or consists essentially of) the following constituents, varying within the weight limits defined below: $SiO_2$: 49%-75%; $Al_2O_3$: 15%-30%; $Li_2O$: 1%-8%; $K_2O$: 0%-5%; $Na_2O$: 0%-5%; ZnO: 0%-5%; MgO: 0%-5%; CaO: 0%-5%; BaO: 0%-5%; SrO: 0%-5%; $TiO_2$: 0%-6%; $ZrO_2$: 0%-5%; $P_2O_5$: 0%-10%; $B_2O_3$: 0%-5% (and preferably 0).

A particularly preferred chemical composition (initially or at the core of the plate) comprises (or consists essentially of) the following constituents, which varying the weight limits defined below: $SiO_2$: 52%-75%; $Al_2O_3$: 18%-27%; $Li_2O$: 1.5%-5.5%; $K_2O$: 0%-3%; $Na_2O$: 0%-3%; ZnO: 0%-3.5%; MgO: 0%-3%; CaO: 0%-4.5%; BaO: 0%-3.5%; SrO: 0%-2%; $TiO_2$: 0%-5.5%; $ZrO_2$: 0%-3%; $P_2O_5$: 0%-8%; $B_2O_3$: 0%-3% (and preferably 0).

In the compositions above, silica ($SiO_2$) is the main glass-forming oxide, with high levels contributing to an increase in the viscosity of the glass beyond what is acceptable, and excessively low amounts increasing the thermal expansion coefficient. Alumina ($Al_2O_3$) also contributes to an increase in the viscosity of the glass and to a reduction in its expansion coefficient. Although the presence of other alkali metal oxides is not excluded (for example, $Na_2O$, it being possible for the sodium ions, where appropriate, also to be replaced with potassium ions at the surface), lithium oxide ($Li_2O$) is preferably the only alkali metal oxide present in the composition (apart from the unavoidable impurities). Excessively high amounts, however, increase the tendency of the glass to devitrify. The alkali metal oxides allow the glass to fluidify and hence make it easier for it to be melted and refined, and lithium oxide also allows low thermal expansion coefficients to be maintained relative to the other alkali metal oxides. Alkaline-earth metal oxides, and also barium oxide (BaO), are useful for making it easier for the glass to be melted and refined, owing to their effect of reducing the high-temperature viscosity.

The expression "consists essentially of" should be understood to mean that the aforementioned oxides make up at least 96%, or even 98%, of the weight of the glass. The composition may further comprise additives which serve generally for refining the glass or for coloring the glass. The refining agents are typically selected from oxides of arsenic, of antimony, of tin, and of cerium, halogens, and metal sulfides, in particular zinc sulfide. The amount by weight of refining agents is normally not more than 1%, preferably between 0.1% and 0.6%. The coloring agents are iron oxide, present as an impurity in the majority of the raw materials, cobalt oxide, chromium oxide, copper oxide, vanadium oxide, nickel oxide, and selenium. The total amount by weight of coloring agents is normally not more than 2%, or even 1%. The introduction of one or more of these agents may result in a dark glass plate, with very low light transmittance (typically not more than 3%, in particular 2% and even 1%), which will have the advantage of concealing the inductors, the electrical wiring, and also the circuits for control and monitoring of the cooking appliance. Another alternative, described further on in the text, involves equipping part of the surface of the plate with an opaque or substantially opaque coating, or in disposing an opaque material, preferably of dark color, between the plate and the internal elements of the appliance.

The linear thermal expansion coefficient of the glass (measured according to the standard ISO 7991: 1987 between 20 and 300° C.) is preferably not more than $70 \times 10^{-7}$/K, and in particular is between $30 \times 10^{-7}$/K and $50 \times 10^{-7}$/K. High thermal expansion coefficients do not allow adequate thermal shock resistance to be obtained. On the other hand, too low a thermal expansion coefficient may reduce the strengthening observed.

As indicated above, the plates according to the invention may advantageously be thin plates, but also plates with large lateral dimensions, these plates being those most likely to break. The thickness of the plate is, in particular, not more than 4.5 mm, more particularly less than or equal to 4 mm, or even to 3.5 mm, or even less than or equal to 3 mm, as indicated above. The thickness is generally at least 1.5 mm, more particularly at least 2 mm. The glass plate preferably has a lateral dimension of at least 0.5 m, or even 0.6 m. The largest dimension is generally not more than 1.50 m.

The plates may be manufactured in a known manner by melting of pulverulent raw materials followed by forming of the resulting glass. Melting is carried out typically in refractory furnaces by means of burners which use air or oxygen as oxidizer, and natural gas or fuel oil as fuel. Molybdenum or platinum resistors immersed in the molten glass may also provide some or all of the energy used to obtain molten glass. Raw materials (silica, spodumene, petalite, etc.) are introduced into the furnace and, under the effect of the high temperatures, undergo various chemical reactions, such as decarbonation reactions, actual melting reactions, etc. The maximum temperature reached by the glass is typically at least 1500° C., in particular between 1600 and 1700° C. The glass can be formed into plates in a known way by rolling of the glass between metal or ceramic rollers, or else by the float process, a technique that involves pouring the molten glass onto a bath of molten tin.

Strengthening by potassium ion exchange is carried out by immersing the glass plates thus formed into at least one, preferably a single, bath of potassium salts (the potassium salts may be alone or in a mixture with other salts, as for example silver salts or sodium salts)—for example, a bath containing potassium nitrate, more particularly a bath composed 100% of potassium nitrate, this bath being heated preferably to a temperature of at least 360° C. for at least 8 h in order to give the strengthened plate according to the invention. The bath is generally obtained by heating the selected salt or salts (which may be solid at ambient temperature), in a steel vat and by means of resistance heaters, for example, to the desired temperature. This bath temperature is preferably between 360° C. and 500° C., more particularly between 400° C. and 500° C., in particular between 450° C. (or even 460° C.) and 500° C., in the present invention; the hold time of the glass in the bath is also preferably between 8 h and 72 h, more particularly between 16 and 32 h, or even between 16 and 24 h, in order to give the strengthened plate according to the invention. Where appropriate, the glasses may have been preheated, as for example by holding them for several minutes (more particularly around ten minutes) above the bath of molten salts that has been heated to temperature, before being immersed into the bath. The bath of melted potassium salts is subsequently maintained at temperature throughout the treatment time (more particularly between 8 to 72 h, in particular between 16 and 24 h), and then the glasses are withdrawn from the bath, cooled (cooling taking place, for example, at ambient temperature by leaving the glasses to rest in the tempering room on a support, as for example a metal support of steel basket type), and then, where appropriate, are rinsed (in particular for the purpose of removing the cooled salts, which form a film on the surface of the glass), with water or with another solvent, for example, prior to optional drying (for example, at ambient temperature in the room or by air jet, etc.).

As indicated above, the particularly satisfactory and lasting mechanical strengthening obtained for the plates according to the invention makes it possible if needed to reduce the thickness of the plates used, while retaining high mechanical strength. Preferably, however, the glass plate remains capable of concealing the inductors, the electrical wiring, and the circuits for controlling and monitoring the cooking appliance, with only the display devices remaining, preferably, visible by the user. Especially when the transmittance of the glass plate as such is high (more particularly above 3%) and/or when the colorants which are present, where appropriate, in the glass do not permit sufficient opacification of the plate, it is possible to provide at least part of the surface of the plate (particularly that part which, in the cooking appliance, is situated opposite the elements to be concealed) with a coating (which is applied, for example, to the strengthened plate, in line after its manufacture, or subsequently), said coating having the capacity to absorb and/or reflect and/or diffuse luminous radiation. The coating may be applied under the plate, in other words to the surface intended to be sited opposite the internal elements of the appliance, also called "bottom face", and/or to the plate, in other words to the opposite face or top face. This coating may be continuous or discontinuous (for example, may have patterns or a screen), or discontinuous in certain regions, as for example at the heating elements, and continuous otherwise, it also being possible for one or more uncoated regions to be provided opposite, for example, the devices which give off light (these regions may also be coated with a nonopaque coating). The luminous transmittance of the plate in the coated regions is preferably not more than 0.5%, or even not more than 0.2%, and it is also possible for the coating to be completely opaque.

The plate may further comprise a decorative coating, not necessarily intended for masking the internal elements of the cooking appliance; this decoration makes it possible, for example, to identify the heating zones, the control zones (particularly the touch-sensitive controls), to provide information, to represent a logo, etc.

The coating or coatings may be, for example, one or more organic-based layers, such as a layer of paint or varnish, or one or more inorganic-based layers, such as an enamel or a metallic layer or a layer of a metal oxide, nitride, oxynitride, or oxycarbide. With preference, organic layers are applied at the bottom face, while the inorganic layers, especially enamels, are applied at the top face.

The paint which may be used is advantageously selected so as to withstand high temperatures, to retain its color and its cohesion to the plate, and so as not to adversely affect the mechanical properties of the plate. The paint advantageously has a degradation temperature of greater than 300° C., more particularly between 350° C. and 700° C. Generally it is based on one or more resins (for example, a silicone resin, modified where appropriate by incorporation of a radial such as an alkyd or phenyl or methyl, etc.), and, where appropriate, is filled (for example, with pigment(s) or dye(s)), and optionally is diluted in order to adjust its viscosity with a view to its application to the plate, with the diluent or solvent (for example, white spirit, toluene, aromatic hydrocarbon solvents, such as the solvent sold under the brand name Solvesso 100® by Exxon, etc.) being removed, where appropriate, during the final firing of the paint.

The pigments present may be, for example, pigments for enamels (of metal oxide or chromate type, examples being oxides of chromium, of copper, of iron, of cobalt, or of nickel, or copper chromates or cobalt chromates, etc.), particles of one or more metals, or metal alloys. The pigments may also be "effect" pigments (pigments with a metallic, interference, or pearlescent effect, etc.), especially pigments in the form of aluminum oxide ($Al_2O_3$) flakes coated with metal oxides, or those based on mica particles coated with oxides or a combination of oxides.

The paint used preferably comprises at least (or is based on) a (co)polymer which withstands high temperature (more particularly, having a degradation temperature of greater than 400° C.)—for example, the paint comprises one or more of the following resins: polyimide, polyamide, polyfluoro, polysilsesquioxane and/or polysiloxane resin. Polysiloxane resins are particularly advantageous. These resins may be used in the crosslinkable or converted (crosslinked or pyrolyzed) state. Advantageously they have phenyl, ethyl, propyl and/or vinyl units, and in particular are selected from polydimethylsiloxanes, polydiphenylsiloxanes, phenylmethylsiloxane polymers, and dimethylsiloxane-diphenylsiloxane copolymers. Dow Corning® 804, 805, 806, 808, 840, 249, 409 HS and 418 HS resins, Rhodorsil® 6405 and 6406 resins from Rhodia, Triplus® resins from General Electric Silicone, and SILRES® 604 resin from Wacker Chemie GmbH, are especially suitable. The resins thus selected are capable in particular of withstanding induction heating.

The paint may be free of inorganic fillers, especially if its thickness remains low, or may comprise such fillers, for the purpose, in particular, of strengthening the paint layer, contributing to its cohesion, combating the appearance and propagation of cracks within it, etc. (some of these fillers being, preferably, of lamellar structure); the fillers may also be involved in coloring. The level of inorganic fillers may in particular be from 10% to 60% by volume, more particularly from 15% to 30% (volume levels based on the total volume of the fillers and of the paint).

The thickness of each layer of paint applied may be between 1 and 100 microns, in particular between 5 and 50 microns. The paint may be applied by any appropriate technique (by brush, by knife, by spraying, electrostatic application, immersion, curtain coating, screen printing, inkjet, etc.), and takes place preferably by screen printing. Application may be followed by a heat treatment intended to ensure, where appropriate, the drying, crosslinking, pyrolysis, etc., of the layer or layers applied.

The layer or layers of paint may where appropriate be covered with a protective layer, as for example a layer of silicone resin modified with polysiloxane resin or alkyl radicals.

As indicated above, the coating may also be at least one enamel. The enamel is formed from a powder comprising a glass frit and pigments (these pigments may also be part of the frit), and from a medium for application to the substrate. The glass frit is preferably obtained from a vitrifiable blend comprising, generally, oxides selected in particular from oxides of silicon, of zinc, of sodium, of boron, of lithium, of potassium, of calcium, of aluminum, of magnesium, of barium, of strontium, of antimony, of titanium, of zirconium, and/or of bismuth. The pigments may be selected from those cited above in relation to the paint, with the level of pigment(s) in the frit(s)/pigment(s) system being, for example, between 30% and 60% by weight.

The layer may in particular be applied by screen printing (with the base and the pigments being suspended, where appropriate, in a medium, generally intended to be consumed in a subsequent firing step, it being possible for this medium in particular to comprise solvents, diluents, oils, resins, etc.); the thickness of the layer is, for example, of the order of 1 to 6 μm (the thickness generally does not exceed 6 μm, and more particularly does not exceed 3 μm). The screen printing technique is advantageous in that in particular it allows certain regions of the plate to be reserved, in particular the regions which will be opposite the devices giving off light.

The coating may also be at least one metallic layer or a layer of a metal oxide, nitride, oxynitride, or oxycarbide. The term "layer" also includes stacks of layers. Each layer may be, for example, a single metallic or substantially metallic layer (for example a thin layer of Ag, W, Ta, Mo, Ti, Al, Cr, Ni, Zn, Fe, or an alloy of metals, or based on stainless steels, etc.), or may be a stack of (sub)layers comprising one or more metallic layers, as for example a metallic (or substantially metallic) layer protected (coated on at least one face and preferably on its two opposite faces) with at least one layer based on dielectric material (for example, at least one layer of silver or of aluminum coated with at least one protective layer of $Si_3N_4$—more particularly an $Si_3N_4$/metal/$Si_3N_4$ stack—or of $SiO_2$). Alternatively the coating may be a single-layer coating based on dielectric material with a high refractive index n, in other words an index of more than 1.8, preferably more than 1.95, more particularly more than 2. The layer may also be formed of a stack of thin (sub)layers based on dielectric material(s) alternatively of high (preferably greater than 1.8, or even 1.95, or even 2) and low (preferably lower than 1.65) refractive indices, especially material(s) of metal oxide (or metal nitride or oxynitride), or mixed oxide (tin-zinc, zinc-titanium, silicon-titanium, etc.) or alloy type, etc.; advantageously, the (sub)layer applied, where appropriate, first and situated against the inner face of the plate is a high refractive index layer.

High refractive index (sub)layer material includes, for example, $TiO_2$ or optionally $SnO_2$, $Si_3N_4$, $Sn_xZn_yO_z$, $TiO_x$ or $Si_xTi_yO_z$, ZnO, $ZrO_2$, $Nb_2O_5$, etc. Low refractive index (sub)layer material includes, for example, $SiO_2$, or optionally a silicon oxynitride and/or oxycarbide, or a mixed silicon aluminum oxide, or a fluoro compound, of $MgF_2$ or $AlF_3$ type, for example, etc.

The (geometric) thickness of each applied layer based on (a) thin layer(s) is generally between 15 and 1000 nm, more particularly 20 and 1000 nm, it being possible for the thickness of each of the (sub)layers (in the case of a stack) to vary between 5 and 160 nm, generally between 20 and 150 nm. The layer based on (a) thin layer(s) may be applied to the plate in line or subsequently (for example, after said plate has been cut out and/or shaped), in particular by pyrolysis, by evaporation, or by spraying. The layer is preferably applied by spraying and/or by a vacuum and/or plasma-assisted coating method, in particular by cathodic sputtering (magnetron), assisted in particular by magnetic field, with the oxides or nitrides being applied from metal or alloy or silicon or ceramic target(s), etc., which are appropriate, if necessary under oxidizing or nitriding conditions (mixtures, where appropriate, of argon/oxygen or argon/nitrogen).

As indicated earlier, the present invention also relates to an induction cooking appliance comprising at least one plate (equipped with an opacifying coating as described in the preceding paragraphs, or otherwise) according to the invention and at least one inductor (more particularly disposed beneath said plate). Apart from said plate and the inductor or inductors, the cooking appliance may likewise comprise at least one light-emitting device, and also at least one control and monitoring device, the assembly being generally held within a housing.

The light-emitting device or devices are advantageously selected from light-emitting diodes (forming part of 7-segment displays, for example), liquid-crystal displays (LCDs), light-emitting diodes, possibly organic (OLEDs), and fluorescent displays (VFDs), it being possible for the colors viewed through the plate to be varied (red, green, blue, and all the possible combinations, including yellow, violet, white, etc.). These devices may be decorative and/or may where appropriate display various information useful to the user, especially heating power, temperature, cooking programs, cooking times, regions of the plate exceeding a predetermined temperature, etc.

The control and monitoring devices may in particular be mechanical or may advantageously comprise touch-sensitive controls, of capacitive or infrared type, for example.

The entirety of the internal elements are generally attached to a housing, often a metallic housing, which forms, for example, the lower part of the cooking appliance, normally concealed in the worktop or in the body of the stove. Alternatively to the more or less opacifying coating set out above and applied to the plate, a material or element, more particularly an opacifying material or element, may also be disposed between the plate and the internal elements of the appliance, in order in particular to mask at least part of the internal elements.

The examples which follow illustrate the invention but without limiting it, presenting the results obtained with glass plates according to the present invention (example 1) by comparison with a reference example relating to glass plates which have the same initial composition but are reinforced by sodium exchange.

INVENTIVE EXAMPLE

In this example, a sheet of lithium aluminosilicate glass 3 mm thick was manufactured in a known way by melting and roll-forming, the glass having the following composition by weight:

| | |
|---|---|
| $SiO_2$ | 67.4% |
| $Al_2O_3$ | 20.0% |
| $Li_2O$ | 3.45% |
| $Na_2O$ | 0.15% |
| $K_2O$ | 0.2% |
| ZnO | 1.6% |
| MgO | 1.25% |
| $TiO_2$ | 2.6% |
| $ZrO_2$ | 1.7% |
| $As_2O_3$ | 0.8% |
| BaO | 0.8% |
| $Fe_2O_3$ | 0.019% |

The linear expansion coefficient of the glass was $41 \times 10^{-7}$/K.

Plates measuring 70×70 mm were cut out from this glass sheet and then tempered in a potassium nitrate bath for 32 h at 460° C., to give a depth of exchange (thickness of the surface zone, strengthened with potassium, according to the invention, and evaluated by the weight-taking method) of 50 μm.

The glass plates were subsequently cooled to ambient temperature of 20° C., then rinsed with water, then dried at ambient temperature of 20° C.

The level of potassium was subsequently measured at the surface of the glass by means of an electronic micro-probe for the plates obtained, the level measured being 9% in this example, and the difference $\Delta_S[K_2O]$ between the level of potassium at the surface of the glass ($[K_2O]_S$=9% by weight) and the level of potassium in the core of the plate ($[K_2O]$ c=0.2% by weight) being therefore approximately 8.8%. The flexural breaking stress in the ring-on-tripod test was also evaluated on said plates before detempering, with the values obtained on 10 plates tested being between 740 MPa and 820 MPa. The core stress was also evaluated, this stress being 5 MPa.

Detempering tests were subsequently performed on these glasses. Two detempering cases were considered: a residence of 1000 h in an oven at 350° C., simulating normal use of an induction plate 3 mm thick over 5 years, and a residence of 10 minutes in an oven at 450° C., simulating an accidental event of overheating of the plate. The breaking stresses in the ring flexural test were subsequently evaluated. The values obtained on 5 plates tested were between 600 and 700 MPa after heating at 350° C. for 1000 h, and were between 680 and 820 MPa after heating at 450° C. for 10 minutes.

In spite of a loss of mechanical strength measured on the glasses detempered at 350° C. for 1000 h, the performance level was nevertheless largely above that required at this thickness (and even at lesser thicknesses, of 1.6 mm, for example) for a cooking plate application, with the mechanical strength, moreover, being virtually unaffected by the detempering for 10 minutes at 450° C.

The resulting plates of glass were also subjected to scratch tests. Their surface remained free from flakes after application of a Vickers point under a force of 1 N (as against 0.5 N for the same glasses without strengthening), and it remained free from lateral fissures following application of an Erichsen ball under a force of 30 N (as against 10 to 15 N for the same glasses without strengthening).

REFERENCE EXAMPLE

The procedure of the preceding example was repeated, this time carrying out tempering at 395° C. for 4 h (tempering being much more rapid than in the case of potassium); the thickness of the surface zone of the plate strengthened with sodium that was obtained according to this comparative example was 130 μm.

The level of sodium measured (by electronic microprobe) at the surface of the glass for the plates obtained was 6%. The flexural breaking stress in the ring-on-tripod test was also evaluated before detempering, with the values obtained on 2 plates tested being between 450 MPa and 600 MPa. The core stress was also evaluated, this stress being 14 MPa.

Detempering tests were subsequently carried out, and the breaking stresses in the ring flexural test were evaluated. The values obtained on plates tested were between 90 and 300 MPa after heating at 350° C. for 1000 h. Accordingly, a much more severe effect of the detempering was observed, relative to the glass strengthened with potassium according to the invention, and this makes these plates much less suitable for use as cooking plates.

The glass plates according to the invention may be used with advantage as induction cooking plates, intended, for example, for integration in a worktop or a stove, or a fixed or portable housing, etc.

The invention claimed is:

1. A plate configured to cover or receive one or more induction heating elements,
wherein the plate is a glass plate having a lithium aluminosilicate composition,
wherein the plate has a surface zone comprising potassium ions in replacement of lithium ions of the glass,
wherein the surface zone has a thickness of at least 5 μm, and
wherein a level of potassium at a surface of the glass is greater by at least 3% by weight relative to a level of potassium in a central zone.

2. The plate as claimed in claim 1, wherein the thickness of the surface zone is between 40 and 120 μm.

3. The plate of claim 1, wherein a level of potassium at a surface of the glass is greater by 5% to 14% by weight relative to a level of potassium in a central zone.

4. The plate of claim 1, wherein a level of potassium over a thickness of 5 μm from a surface of the glass reduces by less than 30% after heating at 350° C. for 1000 h.

5. The plate of claim 1, wherein a flexural breaking stress of the plate before detempering is at least 550 MPa.

6. The plate of claim 1, having a flexural breaking stress of at least 400 MPa after heating at 350° C. for 1000 h, and/or of at least 550 MPa after heating at 450° C. for 10 minutes.

7. The plate of claim 1, having a core stress between 2 and 80 MPa for a thickness of 1.5 to 6 mm.

8. The plate of claim 1, wherein the plate is resistant to formation of flakes by application of a point under a force of 1 N, and/or wherein the plate is resistant to formation of cracks after application of a 500 μm-diameter steel ball under a force of 20 N.

9. The plate of claim 1, wherein the thickness of the glass plate is less than or equal to 4 mm.

10. The plate of claim 1, wherein the chemical composition of the glass, initially or at the core of the plate, comprises silica $SiO_2$ in an amount by weight of from 49% to 75%, alumina $Al_2O_3$ in an amount by weight of from 15% to 30%, and lithium oxide $Li_2O$ in an amount by weight of from 1% to 8%.

11. The plate of claim 1, wherein the chemical composition of the glass, initially or at the core of the plate, comprises:

| | |
|---|---|
| $SiO_2$: | 49%-75%; |
| $Al_2O_3$: | 15%-30%; |
| $Li_2O$: | 1%-8%; |
| $K_2O$: | 0%-5%; |
| $Na_2O$: | 0%-5%; |
| ZnO: | 0%-5%; |
| MgO: | 0%-5%; |
| CaO: | 0%-5%; |
| BaO: | 0%-5%; |
| SrO: | 0%-5%; |
| $TiO_2$: | 0%-6%; |
| $ZrO_2$: | 0%-5%; |
| $P_2O_5$: | 0%-10%; and |
| $B_2O_3$: | 0%-5%. |

12. The plate of claim 1, wherein the chemical composition of the glass, initially or at the core of the plate, comprises:

| | |
|---|---|
| $SiO_2$: | 52%-75%; |
| $Al_2O_3$: | 18%-27%; |
| $Li_2O$: | 1.5%-5.5%; |
| $K_2O$: | 0%-3%; |
| $Na_2O$: | 0%-3%; |
| ZnO: | 0%-3.5%; |
| MgO: | 0%-3%; |
| CaO: | 0%-4.5%; |
| BaO: | 0%-3.5%; |
| SrO: | 0%-2%; |
| $TiO_2$: | 0%-5.5%; |
| $ZrO_2$: | 0%-3%; |
| $P_2O_5$: | 0%-8%; and |
| $B_2O_3$: | 0%-3%. |

13. The plate of claim 1, wherein the linear thermal expansion coefficient of the glass is not more than $70 \times 10^{-7}/K$.

14. A method for manufacturing the plate of claim 1, the method comprising contacting a lithium aluminosilicate glass plate with at least one potassium salt.

15. The method as claimed in claim 14, comprising tempering the glass plate in at least one potassium salt bath.

16. The method of claim 15, further comprising preheating the glass before immersing into the bath, and cooling the glass after withdrawal from the bath.

17. The plate as claimed in claim 1, wherein the thickness of the surface zone is between 50 and 120 μm from the surface of the glass plate, and the central zone, which is directly adjacent to the surface zone, has a thickness of at least 1.5 mm.

18. An induction cooking appliance comprising:
at least one inductor; and
at least one plate configured to cover or receive one or more induction heating elements,
wherein the plate is a glass plate having a lithium aluminosilicate composition,
wherein the plate has a surface zone comprising potassium ions in replacement of lithium ions of the glass,
wherein the surface zone has a thickness of at least 5 μm, and
wherein a level of potassium at a surface of the glass is greater by at least 3% by weight relative to a level of potassium in a central zone.

19. The appliance of claim 18, wherein at least part of a surface of the at least one plate is equipped with at least one coating, and/or wherein a material or element is disposed between the plate and internal elements of the appliance.

* * * * *